US008882972B2

(12) United States Patent
Wuebben et al.

(10) Patent No.: US 8,882,972 B2
(45) Date of Patent: Nov. 11, 2014

(54) SUPPORT OF ION EXCHANGE MEMBRANES (75) Inventors: Kevin A. Wuebben, Apple Valley, MN (US); Scott R. Limback, St. Paul, MN (US); Barry R. Taylor, Adrian, MI (US)

(73) Assignee: Ecolab USA Inc, Saint Paul, MN (US)

( * ) Notice: Subject to any disclaimer, the term of this patent is extended or adjusted under 35 U.S.C. 154(b) by 274 days.

(21) Appl. No.: 13/185,874

(22) Filed: Jul. 19, 2011

(65) Prior Publication Data

US 2013/0020206 A1 Jan. 24, 2013

(51) Int. Cl.
*C25B 9/08* (2006.01)
*C25B 1/26* (2006.01)

(52) U.S. Cl.
CPC .... *C25B 1/26* (2013.01); *C25B 9/08* (2013.01)
USPC .......................... 204/252; 205/500

(58) Field of Classification Search
None
See application file for complete search history.

(56) References Cited

U.S. PATENT DOCUMENTS

| | | | |
|---|---|---|---|
| 1,284,618 A | 11/1918 | Dow | |
| 3,463,709 A | 8/1969 | Russell | |
| 3,869,376 A | 3/1975 | Tejeda | |
| 3,893,897 A | 7/1975 | Raetzsch et al. | |
| 3,904,496 A | 9/1975 | Harke et al. | |
| 4,118,305 A | 10/1978 | Oloman et al. | |
| 4,214,958 A * | 7/1980 | Coker et al. | 205/514 |
| 4,240,884 A | 12/1980 | Pellegri | |
| 4,256,551 A | 3/1981 | Cliff et al. | |
| 4,305,793 A | 12/1981 | Broniewski | |
| 4,308,124 A | 12/1981 | Pellegri | |
| 4,315,805 A | 2/1982 | Darlington et al. | |
| 4,343,689 A | 8/1982 | de Nora et al. | |
| 4,457,813 A | 7/1984 | Rogers et al. | |
| 4,465,573 A | 8/1984 | O'Hare | |
| 4,627,897 A | 12/1986 | Tetzlaff et al. | |
| 4,687,561 A | 8/1987 | Kunz | |
| 4,753,818 A | 6/1988 | Rogers, Jr. | |
| 4,758,317 A | 7/1988 | Chiang | |
| 4,904,357 A | 2/1990 | Sharifian et al. | |
| 4,964,970 A | 10/1990 | O'Hare | |
| 5,288,385 A | 2/1994 | Kedem et al. | |
| 5,374,341 A | 12/1994 | Aoki et al. | |
| 5,376,253 A * | 12/1994 | Rychen et al. | 204/632 |
| 5,427,667 A | 6/1995 | Bakhir et al. | |
| 5,445,722 A | 8/1995 | Yamaguti et al. | |
| 5,466,347 A | 11/1995 | Shimamune et al. | |
| 5,507,932 A | 4/1996 | Robinson | |

(Continued)

FOREIGN PATENT DOCUMENTS

DE 60218256 T2 10/2007
EP 0 885 849 A1 12/1998

(Continued)

OTHER PUBLICATIONS

JP2002301478, EBARA—English Abstract.

(Continued)

*Primary Examiner* — Harry D Wilkins, III
(74) *Attorney, Agent, or Firm* — McKee, Voorhees & Sease (57) ABSTRACT

A support member for an improved three-chambered electrolytic cell is disclosed. A porous synthetic support system for exchange membranes in electrolytic cells is used for exchange membrane protection in electrolytic cells for the in situ generation of electrolysis solutions, such as bleach or hypochlorous acid.

21 Claims, 4 Drawing Sheets

(56) References Cited

U.S. PATENT DOCUMENTS

| | | |
|---|---|---|
| 5,595,641 A | 1/1997 | Traini et al. |
| 5,616,221 A | 4/1997 | Aoki et al. |
| 5,624,535 A | 4/1997 | Tsuchikawa et al. |
| 5,628,888 A | 5/1997 | Bakhir et al. |
| 5,635,040 A | 6/1997 | Bakhir et al. |
| 5,645,700 A | 7/1997 | White et al. |
| 5,674,365 A | 10/1997 | Sano |
| 5,728,274 A | 3/1998 | Kamitani et al. |
| 5,783,052 A | 7/1998 | Bakhir et al. |
| 5,865,966 A * | 2/1999 | Watanabe et al. .......... 204/278.5 |
| 5,871,623 A | 2/1999 | Bakhir et al. |
| 5,897,757 A | 4/1999 | Sano |
| 5,932,171 A | 8/1999 | Malchesky |
| 5,948,220 A | 9/1999 | Kamitani et al. |
| 5,985,109 A | 11/1999 | Hara |
| 5,985,110 A | 11/1999 | Bakhir et al. |
| 6,004,439 A | 12/1999 | Bakhir et al. |
| 6,007,696 A | 12/1999 | Takayasu et al. |
| 6,096,177 A | 8/2000 | Kamitani et al. |
| RE36,972 E | 11/2000 | Baker et al. |
| 6,143,163 A | 11/2000 | Sawamoto et al. |
| 6,187,154 B1 | 2/2001 | Yamaguchi et al. |
| 6,235,186 B1 | 5/2001 | Tanaka et al. |
| 6,391,169 B1 | 5/2002 | Hara et al. |
| 6,524,450 B1 | 2/2003 | Hara |
| 6,524,454 B2 | 2/2003 | Byron, Jr. et al. |
| 6,585,867 B1 | 7/2003 | Asano |
| 6,592,727 B2 | 7/2003 | Yamamoto |
| 6,607,647 B2 | 8/2003 | Wilkins et al. |
| 6,632,347 B1 | 10/2003 | Buckley et al. |
| 6,682,843 B2 | 1/2004 | Speranza et al. |
| 6,852,205 B1 * | 2/2005 | Toyoshima et al. ............ 204/288 |
| 6,923,893 B2 | 8/2005 | Sano |
| 6,926,988 B2 | 8/2005 | Dristy et al. |
| 7,008,523 B2 | 3/2006 | Herrington |
| 7,090,753 B2 | 8/2006 | Sumita |
| 7,186,323 B2 | 3/2007 | Hara |
| 7,238,272 B2 | 7/2007 | Sano |
| 7,303,660 B2 | 12/2007 | Buckley et al. |
| 7,422,668 B2 | 9/2008 | Cross |
| 7,442,288 B2 | 10/2008 | Sumita |
| 7,625,470 B2 | 12/2009 | Wright et al. |
| 7,681,278 B2 | 3/2010 | Chugun |
| 7,749,370 B2 | 7/2010 | Sumita |
| 7,828,941 B2 | 11/2010 | Oldani et al. |
| 7,922,890 B2 | 4/2011 | Sanchez et al. |
| 7,955,481 B2 | 6/2011 | Sanchez et al. |
| 7,967,958 B2 | 6/2011 | Sano |
| 2004/0020787 A1 | 2/2004 | Sano |
| 2005/0121334 A1 | 6/2005 | Sumita |
| 2005/0139808 A1 | 6/2005 | Alimi |
| 2005/0142157 A1 | 6/2005 | Alimi |
| 2006/0037869 A1 | 2/2006 | Mitchke |
| 2006/0260954 A1 | 11/2006 | Sano et al. |
| 2008/0264778 A1 | 10/2008 | Joshi et al. |
| 2008/0292537 A1 | 11/2008 | Sano |
| 2008/0295951 A1 | 12/2008 | Hiro et al. |
| 2009/0008263 A1 | 1/2009 | Achiwa |
| 2009/0035631 A1 | 2/2009 | Zagaja et al. |
| 2009/0229992 A1 | 9/2009 | Sanchez et al. |
| 2010/0187129 A1 | 7/2010 | Sano |
| 2010/0270172 A1 | 10/2010 | Sano |

FOREIGN PATENT DOCUMENTS

| | | |
|---|---|---|
| EP | 1 878 704 A1 | 1/2008 |
| GB | 2352728A A | 2/2001 |
| GB | 2452220 A | 2/2009 |
| JP | 6-179757 | 6/1994 |
| JP | 10-008268 | 1/1998 |
| JP | 11-209887 | 8/1999 |
| JP | 2002301478 A | 10/2002 |
| JP | 2004216302 A | 8/2004 |
| WO | WO 98/13304 A1 | 4/1998 |
| WO | WO 98/25855 | 6/1998 |
| WO | WO 01/57290 A1 | 8/2001 |
| WO | WO 03/048421 A1 | 6/2003 |
| WO | WO 2004/009498 A1 | 1/2004 |
| WO | WO 2004/031077 A2 | 4/2004 |
| WO | WO 2005/065383 A2 | 7/2005 |
| WO | WO 2006/121494 A2 | 11/2006 |
| WO | WO 2006/127633 A2 | 11/2006 |
| WO | WO 2008/048103 A1 | 4/2008 |
| WO | WO 2008/112940 A1 | 9/2008 |
| WO | WO 2009/067213 A2 | 5/2009 |

OTHER PUBLICATIONS

JP2004216302, Kurita Water Industries—English Abstract.

Ecolab USA Inc., PCT/US2012/047363, filed on Jul. 19, 2012, "The International Search Report and the Written Opinion of the International Searching Authority, or the Declaration", mail date Feb. 13, 2013.

* cited by examiner

SUPPORT OF ION EXCHANGE MEMBRANES

FIELD OF THE INVENTION

The invention relates to a porous support system for exchange membranes in electrolytic cells. In particular, the invention relates to the use of a porous material for an apparatus in a three-chambered electrolytic cell for the in situ generation of electrolysis solutions, such as bleach or hypochlorous acid.

BACKGROUND OF THE INVENTION

The production of acidic electrolyzed water and alkaline electrolyzed water by the electrolysis of water in which chlorine electrolyte has been added is well-known. To produce the acidic electrolyzed water and alkaline electrolyzed water by electrolysis of water, for example, a method of using an electrolyzing apparatus having a structural feature of dividing a chamber into an anode chamber and a cathode chamber by a diaphragm and arranging an anode plate in the anode chamber and a cathode plate in the cathode chamber and carrying out the electrolysis by filling the apparatus with water to which electrolyte has previously been added can be mentioned. Further, as another example, a method of using an electrolyzing apparatus having a structural feature to divide a chamber into an anode chamber, an intermediate chamber and a cathode chamber by two diaphragms and introducing concentrated electrolyte into the intermediate chamber, while, introducing water into the anode chamber and the cathode chamber and then carrying out electrolysis can be mentioned. These methods have been practically used.

In these various methods for electrolysis, numerous problems have been identified, including scaling on electrodes, generating precipitate in the electrolyzed solutions, exchange membrane failure, obstruction of fluid flow, increases in voltage demands of the cell, etc. Up to the present time, the phenomenon of exchange membrane failure (including decreased fluid and ion flow, scaling and/or rupturing) has been an unavoidable effect after a certain lifespan of the electrolytic cell.

Commercially-available three-chamber electrolytic cells use various membrane support structures within the cells, all having disadvantages. For example, some cells contain support structures that allow exchange membranes to separate from the electrodes—a disadvantage in efficient conversion of chloride to chlorine in a three-chamber cell. Many support structures also require costly, precise alignment of perforations in the support structure with perforations in the electrodes. Misaligned performations results in reduced ion transport through the exchange membranes and requires a significant increase in voltage demand for the cell, often causing irreproducible cell behavior and poor performance. Yet other support structures such as plastic netting, grids, and meshes can cause membranes to make small radius bends in conforming to the features of the grid or mesh, which leads to local polymer stress and premature membrane failure.

Accordingly, it is an objective of the claimed invention to develop an improved three-chambered electrolytic cell system for generating in situ electrolysis solutions, such as chlorine bleach solutions from salt and water.

A particular object of the invention is an improved exchange membrane support structure within an electrolytic cell.

A further object of the invention is an exchange membrane support structure providing suitable membrane-electrode interface to promote efficient electrolytic cell operation.

These and other objects of the invention will be readily ascertained by one skilled in the art based on the description of the invention.

BRIEF SUMMARY OF THE INVENTION

An advantage of the invention is the improved support provided to an exchange membrane of an electrolytic cell. It is an advantage of the present invention that a porous material provides a means of support to an exchange membrane within an electrolytic cell by applying a differential pressure from an intermediate chamber of a cell to the exchange membrane and an electrode. Beneficially, use of the porous material does not require alignment and/or conditioning of a cell prior to use.

In an embodiment, the present invention provides an improved three-chambered electrolytic cell, comprising an anode chamber housing an anode; a cathode chamber housing a cathode; an intermediate chamber between the anode and cathode chambers; an anion exchange membrane positioned between the anode and the intermediate chamber; a cation exchange membrane positioned between the cathode and the intermediate chamber; and a support member positioned against both the anion exchange membrane causing the membrane to be in contact with the anode and the cation exchange membrane causing the membrane to be in contact with the cathode, wherein the support member comprises a porous material, such as a porous synthetic material.

According to further embodiments of the invention the support member of the electrolytic cell comprises a nonwoven fabric, which may include a polyester nonwoven felt fabric or a plurality of layers of a polyester nonwoven felt fabric. The support member of the electrolytic cell may further comprise a polypropylene material.

In another embodiment of the invention, an electrolytic cell support member is disclosed and comprises a support member positioned within an intermediate chamber of a three-chamber electrolytic cell, wherein the support member applies pressure to an exchange membrane causing the membrane to be in contact with an electrode, and wherein the support member comprises a porous material. According to embodiments of the invention, the support member applies pressure to an anion exchange membrane causing the membrane to be in contact with an anode. According to a further embodiment of the invention, the support member applies pressure to a cation exchange membrane causing the membrane to be in contact with a cathode.

In a still further embodiment of the invention, a method of providing electrolytic cell membrane support comprises preparing an electrolytic cell for electrolysis of a solution, providing an anode chamber housing an anode, a cathode chamber housing a cathode, an intermediate chamber between the anode and cathode chambers, an anion exchange membrane positioned between the anode and the intermediate chamber, a cation exchange membrane positioned between the cathode and the intermediate chamber, and a support member positioned within the intermediate chamber; and applying an electric current, wherein the membrane support decreases the voltage required to achieve the specified current and provides for more uniform flux of ions through the membrane to the electrodes. Preferably according to the invention, the method of providing electrolytic cell membrane support does not require aligning the support member with an electrode for efficient (i.e. low voltage) and reproducible operation.

While multiple embodiments are disclosed, still other embodiments of the present invention will become apparent to those skilled in the art from the following detailed description, which shows and describes illustrative embodiments of

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to a support member for a three chamber electrolysis cell. The cell is divided by membranes into an electrolysis chamber with a positively charged electrode (anode), a middle or intermediate chamber, and an electrolysis chamber with a negatively charged electrode (cathode). Further description of the electrolytic cells suitable for use according to the invention is set forth in U.S. patent application Ser. No. 12/743,785 (Ecolab USA, Inc.), which is herein incorporated by reference in its entirety. The support member for the three chambered electrolysis cell has many advantages over existing support systems. For example, the support member according to the present invention is positioned adjacent to an exchange membrane, rather than placed between an exchange membrane and electrode, so as not to interfere with fluid flow. In addition, the support member provides differential pressure within an intermediate chamber so that an exchange membrane is pressed against the electrode without allowing a decrease in chlorine output from the cell and/or increase in voltage demand of the cell.

The embodiments of this invention are not limited to particular methods of use of support members for a three chambered electrolysis cell, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the component and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The present invention is distinct from membrane support provided in the art. Support structures have been disclosed that center between an exchange membrane and an electrode to provide a protective membrane comprised of various substrates. As disclosed in U.S. patent application Ser. No. 12/743,785 (which is herein incorporated by reference in its entirety), the protective membrane is slitted to allow transfer of liquid and gas between the membrane to transport support the exchange membrane and electrode. Although these types of supports promote electrical conductivity, the slitted protective membrane does not provide support of the exchange membrane against the electrode from a center, intermediate chamber as disclosed according to the present invention.

Additional membrane support systems in the prior art are used between membranes (U.S. Pat. Nos. 5,288,385, 6,524, 454 and Japanese Patent No. 6,179,757, each of which are herein incorporated by reference in its entirety), often for the current reversal cell operation or merely holding membranes in place with no further function within the cell.

However, the support structures fail to achieve the function of the present invention of supporting the exchange membrane against the electrode of the electrolytic cell. In addition, the present invention overcomes the shortfalls of numerous prior art membrane support systems in its ability to promote ion flux through the supported membrane. In addition, beneficially, the present invention does not require alignment with electrode perforations to reduce electrical resistance. As a result, the present invention provides an effective support member for holding ion-permeable membranes (i.e. exchange membranes) against the electrodes of a three-chambered cell.

Embodiments of the Invention

Figure 1:
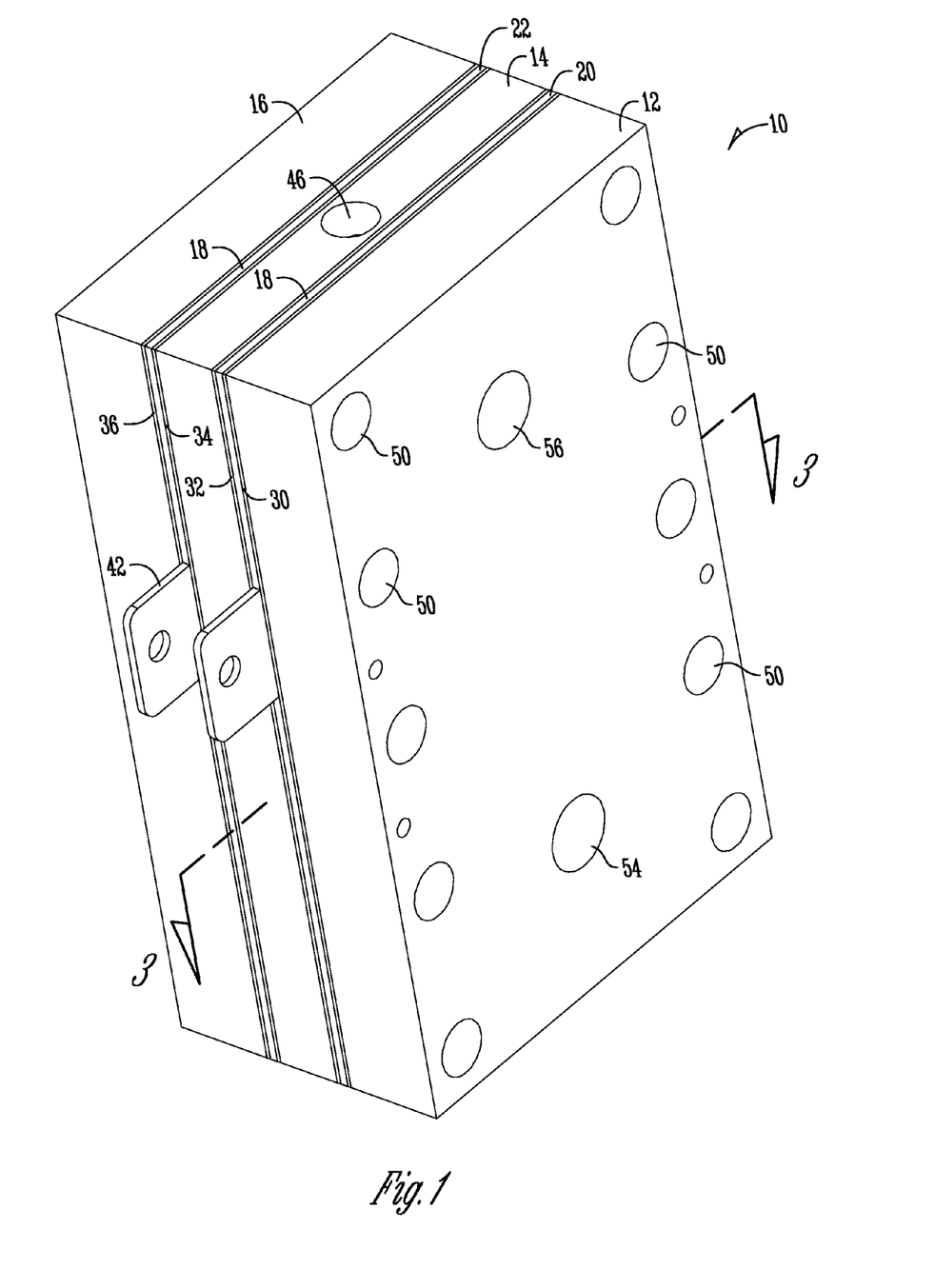
FIG. 1 is a perspective view of a three-chambered electrolytic cell.

FIG. 1 is a perspective view of a three-chambered electrolytic cell 10 suitable for the decomposition of chemical compounds by means of electrical energy (i.e. electrolysis). The electrolytic cell 10 includes three chambers, an anode chamber 12, an intermediate chamber (which may also be called a brine chamber) 14, and a cathode chamber 16. The anode chamber 12 and the cathode chamber 16 are essentially identical in shape and location of holes 50, inlets, outlets, and cavities. The intermediate chamber 14 comprises a similar material as the anode 12 and cathode 16 chambers, but will have differences. The three chambers are connected to one another with the intermediate chamber 14 being between the anode 12 and cathode 16 chambers. The chambers are attached and held in place as shown in FIG. 1.

Figure 2:
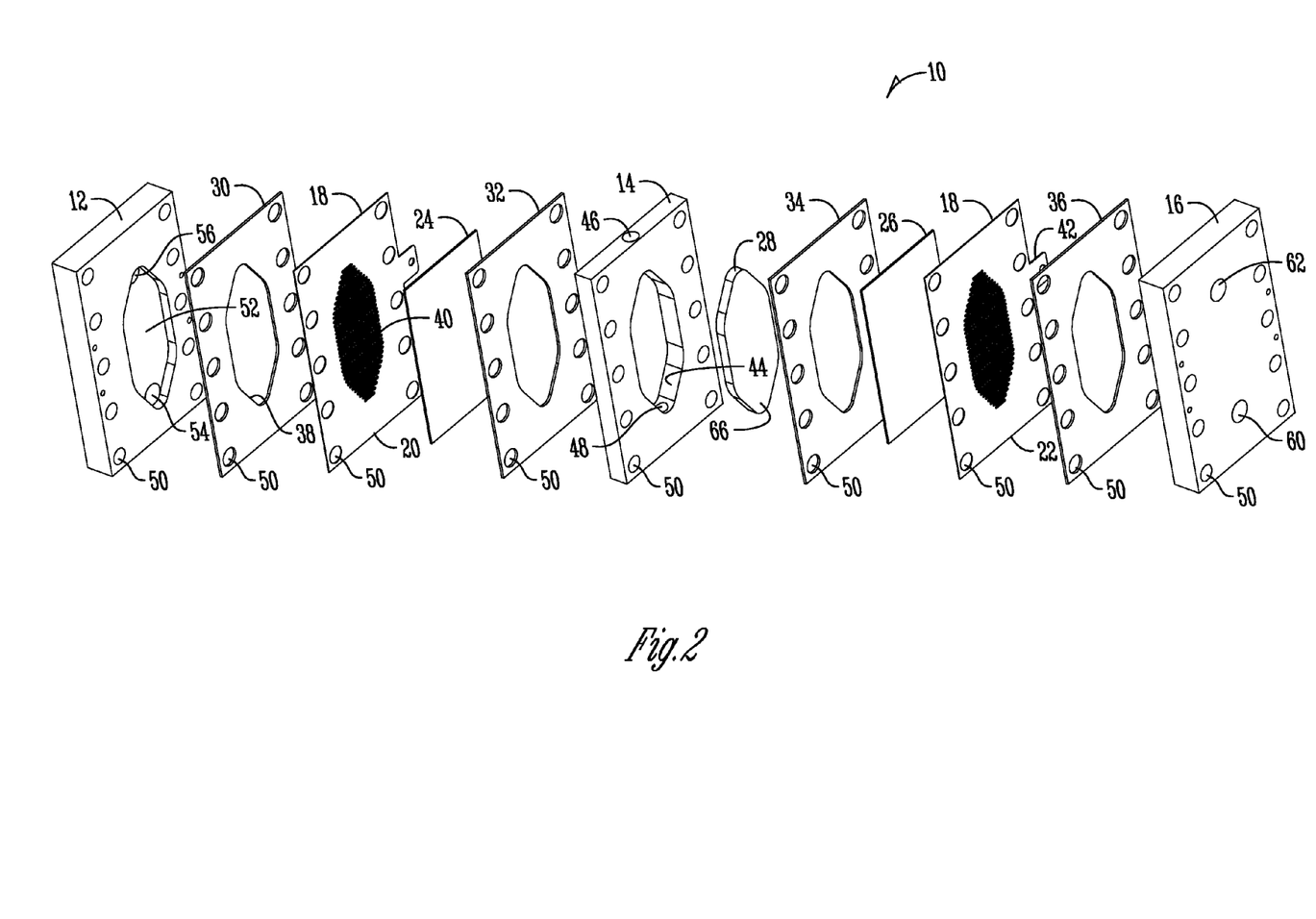
FIG. 2 is an exploded view of the three-chambered electrolytic cell of FIG. 1.
Figure 3:
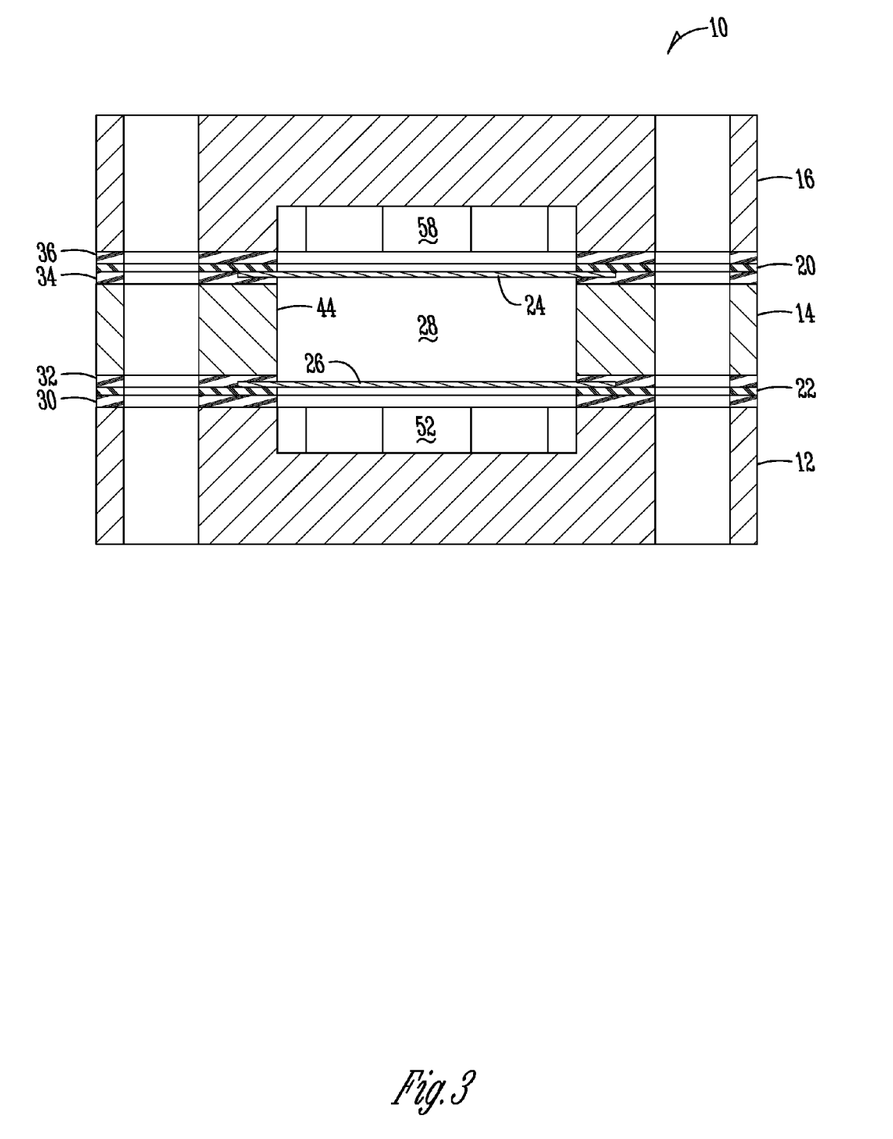
FIG. 3 is a sectional view of the three-chambered electrolytic cell of FIG. 1.

As shown in FIGS. 1-3, the chambers may include a plurality of holes 50 in predetermined locations that coincide with one another. Bolts may be inserted through all of the holes to hold the cell 10 together. However, it should be appreciated that other means of attaching the chambers together may be used. For instance, pins, rivets, clamps, or other fasteners may be used to hold the cell together. It should be noted that while some fastening methods, such as welding, may be used, it is desirable that the fastener be easily removable to provide access to the internal components of the cell 10, such as the support member 28.

FIG. 2 is an exploded view of a three-chambered electrolytic cell 10, such as the one shown in FIG. 1. As described above regarding FIG. 1, the cell 10 includes an anode chamber 12 at one end, a cathode chamber 16 at an opposite end, and an intermediate chamber 14 between the anode chamber 12 and cathode chamber 16. As mentioned, the anode chamber 12 and cathode chamber 16 are essentially identical. The chambers are shown to be rectangular in shape; however, it should be appreciated that any shape may be used as one skilled in the art will ascertain based on the disclosure of the present invention. One size used for the chambers is 4-inch by 5-inch rectangles, with a thickness of 0.5-0.75 inches. The specific size and thickness of the chambers may also vary according to each application or need.

According to one embodiment of the invention, the chambers 14, 16 comprise machined PVC and include inlets 54, 60 and outlets 56, 62 that are NPT fluid connections. The composition of the chambers 14, 16 may comprise other materials (e.g. polypropylene or polyethylene) as one skilled in the art will ascertain based on the disclosure of the present invention. The anode chamber 12 and cathode chamber 16 also include cavities 52, 58 for allowing fluid flow through the chambers. Finally, as mentioned above, the chambers 12, 16 may include a plurality of holes 50. The holes 50 may be recessed and/or threaded to receive fasteners, such as bolts or pins.

The intermediate chamber 14 is also rectangular-shaped and comprises machined PVC. However, the chamber may be other shapes and comprise other rigid materials as well, depending on the other chambers and materials available. The intermediate chamber 14 includes an aperture 44 there through that is generally located at the central region of the chamber. The aperture 44 allows the support member 28 to fit therein to allow ions to pass through. Therefore, the shape of the aperture 44 may be any shape that support member 28 is, and which will allow the most efficient electrolysis process to occur. The intermediate chamber 14 also includes an inlet 46 and an outlet 48 to allow the brine solution (or electrolyte) to pass through. FIG. 2 shows the inlet 46 and outlet 48 on the top and bottom of the chamber, but it should be noted that the location may be varied depending on the specific application.

The intermediate chamber 14 also includes a plurality of holes 50 to allow the fasteners (not shown) to pass through to hold the cell 10 together.

To provide the electrolysis process, electrodes 18 are used with the cell 10. The electrodes 18 include an anode 20 and a cathode 22. According to an embodiment, the anode 20 is positioned within the anode chamber 12 and the cathode 22 is positioned within the cathode chamber 16. According to one embodiment as shown in FIG. 2, the anode 20 is positioned between the anode chamber 12 and the intermediate chamber 14, and the cathode 22 is positioned between the intermediate chamber 14 and the cathode chamber 16. According to this embodiment of the invention, the shape and size of the anode 20 and cathode 22 are generally the same as the chambers to fit between the chambers of the cell 10. As shown in FIG. 2 the anode 20 and cathode 22 are generally rectangles. However, the thickness of the parts of the electrodes 18 is less than the thickness of the chambers. The anode 20 and cathode 22 include a central region of slits, perforations, or slots 40 that allow the ions to pass through. The location and shape of the slits 40 are generally the same as the shape and size of the intermediate aperture 44 and support member 28 for greatest efficiency. The anode 20 and cathode 22 also include at least one electrical connection 42 for receiving an electrical current. The electrical connection 42 may extend away from the anode 20 or cathode 22 as shown in FIG. 2. However, any type of electrical connection is contemplated by the present invention. It should also be noted that the anode 20 and cathode 22 includes holes 50 for allowing the fastener (not shown) to pass through for holding the cell 10 together. The holes 50 or other fastening means will match the rest of the components.

Positioned between the anode 20 and the intermediate chamber 14 is an exchange membrane 24. According to one embodiment of the invention, the exchange membrane 24 is an anion exchange membrane 24. The anion exchange membrane 24 is designed to conduct anions while being impermeable to other ions and to gases such as oxygen or hydrogen.

A second exchange membrane 26 is positioned between the intermediate chamber 14 and the cathode 22. According to one embodiment of the invention, the second exchange membrane 26 is a cation exchange membrane.

According to one embodiment of the invention, both the anion exchange membrane 24 and the cation exchange membrane 26 are thin (about 0.005 inches), flexible, polymer sheets. Other membrane materials may be employed as one skilled in the art will ascertain based on the disclosure of the present invention and such membranes may vary significantly in size and thickness, which are herein incorporated in the scope of the invention. In the embodiment shown in FIGS. 1-3, the exchange membranes 24, 26 are roughly 2.25 inch by 4.75-inch rectangles. Therefore, the membranes are positioned adjacent the anode 20 and cathode 22 such that they are generally centered to the anode and cathode. The exchange membranes will cover the slits 40 of the anode 20 and cathode 22. It should be appreciated that the present invention does not limit the size and/or shape of the exchange membranes 24, 26, and that varying sizes and thicknesses are to be considered part of the invention.

As shown in FIGS. 2 and 3, a support member 28 is positioned generally in the center of the electrolytic cell 10 within the aperture 44 of the intermediate chamber 14. The shape of the support member 28 is selected such that it will fit snugly within the aperture 44 of the intermediate chamber 14. The thickness of the support member 28, or the cumulative thickness of multiple layers of the support member, should be selected such that the support member 28 will press the anion exchange membrane 24 against the anode 20 and the cation exchange membrane 26 against the cathode 22. According to a further embodiment of the invention, the support member is selected for a particular cell to be sufficiently thicker than the intermediate chamber so as to compress upon (i.e. apply sufficient pressure) the exchange membranes against the electrodes.

Variations in the amount of compression between the membranes and electrodes (i.e. pressure applied to the electrodes by the membranes) are achieved according to embodiments of the invention. As one skilled in the art will ascertain, the varying amounts of pressure can be achieved through variations in the support member 28 according to the invention. In addition to the embodiments depicted in the figures of the invention, suitable compression between the membranes and electrodes can also be achieved with various types of mechanical devices and/or units (i.e. springs or spring-loaded device). These embodiments are separate and distinct from support members disclosed herein.

According to a further embodiment of the invention, a support member may comprise, consist of and/or consist essentially of a rigid support member with or without a spring or plurality of springs (or similar device providing compression between the membranes and electrodes of the invention) which push or compress pieces of a compressible fabric (or any porous support member according to the invention). For example, according to an embodiment of the invention, a spring or plurality of springs are compressible and the one or more layers of a compressible fabric or other material comprise the support member of the invention. According to a further embodiment of the invention, a spring or plurality of springs are compressible against the at least one rigid, porous support member according to the invention.

Although not intending to be limited according to any particular theory of the invention, sufficient pressure is applied by the support member 28 to maintain maximum electrode performance (i.e. chlorine output according to this described embodiment of the invention) without experiencing any decrease in electrolyte flow through the center chamber and/or without damaging the membranes 24, 26. Alterations in the thickness of the support member 28, or the cumulative thickness of multiple layers of the support member, control the amount of pressure applied to maintain the membranes against electrodes.

The support member 28 must comprise a material that allows the transport of ions to and through the membranes to promote electrical conductivity through the cell 10. Therefore, the support member 28 of the present invention comprises a porous material. According to a particular embodiment of the invention, the support member 28 comprises a nonwoven, porous material. According to a further embodiment of the invention, the support member 28 comprises a nonwoven, porous material, such as a porous synthetic material. For instance, the support member may comprise one or more layers of polyester nonwoven fabric, i.e. felt. As one skilled in the art will ascertain, multiple layers of the polyester nonwoven fabric may be needed to provide the appropriate thickness to support the membranes 24, 26 against the electrodes 20, 22.

According to one embodiment of the invention, sufficient layers of the polyester nonwoven fabric are added such that the overall thickness of the support member 28 is approximately 0.75 inches for the embodiment of the invention shown in FIGS. 2 and 3. However, other sizes, shapes and thicknesses may be necessary depending on the set-up of the electrolytic cell 10, and thus, the present invention should not be limited to the size, shape and/or thickness stated. It should also be appreciated that if a thick nonwoven material is available in the appropriate thickness, there will be no need for layers and the single-layered material may be used to obtain the design of the support member 28.

Figure 4:
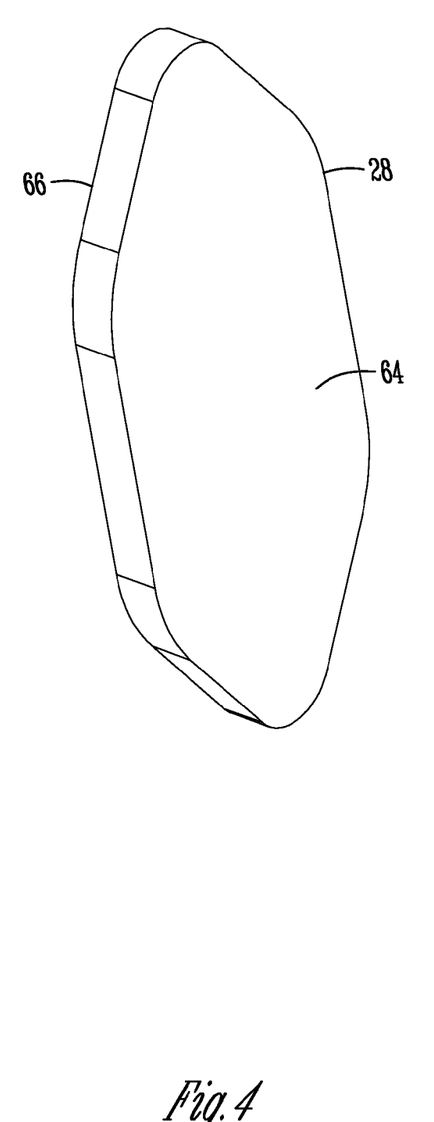
FIG. 4 is a perspective view of a support member used in conjunction of a three-chambered electrolytic cell.

According to an embodiment of the invention, the support member 28 may be obtained (e.g. die cut) from a bulk material to match the required shape and size for a particular electrolytic cell 10. A support member 28 used with the electrolytic cell 10 of FIG. 1 is shown in FIG. 4. Note that the support member 28 includes surface areas 64, 66 on opposite sides of one another with the surface areas comprising a uniform material. As described according to the various embodiments of the invention, the uniform material is a porous material, such as a polyester nonwoven fabric, i.e. felt. However, other materials may also be used for the support member 28. For instance, polypropylene may be used if the material is a nonwoven polypropylene fabric.

The use of the nonwoven material for the support member 28 decreases the voltage required to operate the cell and results in more uniform delivery of ions to all areas of the electrode. In addition, because the support member 28 includes porous surfaces 64, 66 with a distribution of pores or openings generally on a much smaller dimensional scale than the characteristic dimensions of the openings in the electrodes, there is no need to align slits or perforations of the support member with slits 40 of one of the electrodes. Because the entire support member 28 is porous, the ions can pass through at any and all locations of the surface areas 64, 66. In addition, because the support member 28 has a thickness, it will press the membranes 24, 26 against the electrodes 20, 22.

FIG. 3 is a sectional view of the electrolytic cell 10 of FIG. 1 according to the present invention. FIG. 3 shows the inside of the cell 10 when the cell is put together and the anode and cathode chambers 12, 16 are connected on either sides of the intermediate chamber 14. FIG. 3 also illustrates how the thickness of the support member 28 presses the anion exchange membrane 24 against the anode 20 and the cation exchange member 26 against the cathode 22. The figure also shows the anode cavity 52, intermediate chamber aperture 44, and cathode chamber cavity 58. According to one embodiment of the invention, electrolysis is undergone when an electric current is applied between the anode in the anode chamber and the cathode in the cathode chamber, and passes through the electrolyte or brine added to the intermediate chamber.

Finally, as shown in FIGS. 2 and 3, a first gasket 30, second gasket 32, third gasket 34, and fourth gasket 36 is used with the electrolytic cell 10 of the present invention to seal the chambers from one another and the ambient. The first gasket 30 is positioned between the anode chamber 12 and the anode 20. The second gasket 32 is positioned between the anion exchange membrane 24 and the intermediate chamber 14. The third gasket 34 is positioned between the intermediate chamber 14 and the cation exchange membrane 26. The fourth gasket 36 is positioned between the anode 22 and the anode chamber 16. The four gaskets include the same geometry, according to one embodiment including perforations or holes 50, which match up with the fasteners (not shown) used to hold the cell 10 together. The gaskets 30, 32, 34, 36 may comprise synthetic rubber and fluoropolymer elastomer, such as Viton. The size of the gaskets and geometry of gasket apertures 38 and holes 50 for fastening the cell 10 are die-cut, stamped, or otherwise machined per cell specifications. The thickness of the gaskets may vary, but an approximate thickness of 0.031 inches may be used according to one embodiment of the invention.

One skilled in the art will ascertain from the disclosure of the present invention that other gasket materials may also be used (e.g., silicone, closed cell foams made from silicone, PVC, polyethylene, etc.). According to an embodiment of the invention, an electrolytic cell may also be assembled and sealed without gaskets by the use of a curable adhesive or sealant (e.g. RTV silicone rubber).

Variations in Cell Design The invention has been shown and described above with the preferred embodiments, and it is understood that many modifications, substitutions, and additions may be made which are within the intended spirit and scope of the invention. The present invention is not to be limited to any specific embodiment described herein. For instance, the inlets and outlets of the chambers may be reversed or placed elsewhere on the chambers. The size, thickness, shape, and material of each of the components may be varied according to the specific cell and desired output of the system.

Additional variations in cell structure and design include variations to the electrodes. According to one embodiment of the invention, the anode comprises Grade I or Grade II Titanium metal with a DSA (dimensionally stable anode) coating, such as an IRSA coacting, preferably with a coating on one side. The coating may be provided by any of several anode coating suppliers (e.g., Denora, Daiso, Siemens, Water Star, etc.). As one skilled in the art will ascertain the exemplary coatings are non-limiting examples and not intended to limit the scope of the claimed invention. According to a further embodiment of the invention, the cathode comprises an uncoated Hastelloy C276. While the thickness of the anode and cathode may vary, according to a preferred embodiment, the thickness is at least about 0.020 inches.

Variations in exchange membranes are also included in embodiments of the invention. Semi-permeable membranes are preferred, such as cation exchange membranes or anion-exchange membranes. According to one embodiment of the invention, the anion exchange membrane may comprise Neosepta® AMX (commercially available from ASTOM Corporation, 1-4-5 Nishi-Shimbashi, Minato-Ku, Tokyo 105-8429, Japan) or an anion exchange membrane available from Membranes International, Inc. (219 Margaret King Avenue, Ringwood, N.J. 07456 USA). According to a further embodiment of the invention, the cation exchange membrane may comprise DuPont Nafion® N115, N-324 or N424.

Further variations in the support member disclosed according to the invention may include use of various porous materials, such as porous synthetic materials, in addition to non-woven fabrics. According to an embodiment of the invention, any porous material capable of allowing the flow of electrolyte solution through the electrolytic cell (i.e. compatible with the acidic brine solution of the electrolytic cell) may be used. Preferably the support member is compressible as well as porous. Examples of porous materials include, for example, plastic netting and sintered porous plastics. Preferably, the porous material is a woven or nonwoven fabric. Examples of woven or nonwoven fabrics include polyvinylfluoride fiber, asbestos, glass wool, polyvinylchloride fiber, polyvinylidenechloride fiber, polyester fiber or aromatic polyamide fiber. More preferably the material is a nonwoven fabric and may comprise polyester, nylon, polypropylene or polyethylene fibers. Suitable nonwoven fabrics include, for example, polyester (commercially available from Superior Felt & Filtration, LLC, Ingleside, Ill.) and polypropylene (commercially available from Buffalo Felt Products Co., West Seneca, N.Y.). According to a further preferred embodiment of the invention, the material of the support member must be chemically compatible with the electrolyte solution of the particular cell, allow for flow through all dimensions and be compressible. For example, a suitable nonwoven fabric material for use in an acidic brine solution includes a polyester, polypropylene or polyethylene fibers.

Methods of Use

The membrane support and electrolytic cells incorporating the membrane support of the invention are suitable for use in various applications of electrolysis involving membranes. Membranes in electrolytic cells are used to keep electrolyte solutions and chemistry separated; for example, a cell with a membrane can separate caustic from chlorine generated by electrolysis. Accordingly, the support member of the present invention can be used in any water-electrolyzing apparatus having a structural feature to divide an electrolysis cell into an anode chamber, an intermediate chamber and a cathode chamber. The support member and electrolytic cells incorporating the membrane support are used to improve cell function, in particular decreases the voltage required to operate the cell and results in more uniform delivery of ions to all areas of the electrode.

Methods of providing electrolytic cell membrane support according to the invention eliminate the need for alignment of the electrolytic cell support system, membrane and/or electrodes. The methods of the invention apply structural pressure to the membranes to push them against the electrodes and enhance cell performance (e.g. chloride conversion in one embodiment of the invention) while enabling flow of electrolyte fluid through the center, intermediate chamber. This pressure is applied without causing the membranes to deform into the electrode perforations.

Preferably, the methods of the present invention for producing electrolysis solutions comprise, using a water-electrolyzing apparatus having a structural feature to divide an electrolyzer into an anode chamber, an intermediate chamber and a cathode chamber by two diaphragms and arranging an anode plate in the anode chamber, a cathode plate in the cathode chamber and containing an electrolyte solution in the intermediate chamber, providing water to the anode chamber and cathode chamber of said water-electrolyzing apparatus, and generating acidic water in the anode chamber and alkaline water in the cathode chamber by loading electric current so as to electrolyze the water in the presence of electrolyte supplied by means of electrophoresis from the intermediate chamber.

Methods for generating either acidic water using the electrolysis cell comprising the support member of this invention are generally known. When acidic electrolyzed water bearing chlorine is to be generated, a direct current is applied to the cell and the intermediate chamber is filled with a solution of chloride salts, for example, sodium chloride, potassium chloride, or hydrochloric acid solutions, to be electrolyzed. Acidic water is generated with hypochlorous acid as a sanitizing ingredient at an effective chlorine concentration of about 10-500 ppm. Suitable operating conditions for such a cell are known, and some are described or referred to U.S. patent application Ser. No. 11/438,454. Within the cathode chamber, sodium hydroxide or potassium hydroxide and hydrogen gas are generated and discharged from outlets in the cell. The electrolyte solution may be circulated to maintain the concentration of electrolytes in the intermediate cell.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Exploratory testing of a support member according to the invention was conducted using a nonwoven polypropylene material. The polypropylene material was a two layer nonwoven fabric that was hand-cut. Each layer of the material was about 0.375 inches in thickness and added to the intermediate chamber of a three-chambered electrolytic cell to analyze efficacy in membrane support. The material provides about 1.8 lb/yd$^2$ density and was obtained from McMaster-CARR (PN 88125K999) (originally manufactured by Buffalo Felt (West Seneca, N.Y.).

The electrolytic cell housing the support member demonstrated improved operating efficiency. In particular, the electrolytic cell operated at a lower, acceptable voltage.

Example 2

Longer duration testing of a support member comprised of a nonwoven polyester material was conducted. The duration testing analyzed a support member made of a nonwoven polyester material with a rectangular PVC housing as shown in the Figures. The polyester material was a two layer nonwoven fabric that was die-cut and added to the intermediate chamber of a three-chambered electrolytic cell to analyze efficacy in membrane support. Each layer of the material was about 0.375 inches thick and provided about 2.25 lb/yd$^2$ density and was obtained from Grainger (PN 2HVC3) and manufactured by Superior Felt and Filtration (Ingleside, Ill.). The electrolytic cell operated on a catholyte recycling mode (about 84 ml/min flow rate supply). The current was constant at 7.2 Amps with operation constantly from Monday-Friday (cell flushed and turned off over weekends).

The cell was disassembled and analyzed after 100 hours of operation and at 480 hours of operation. Results demonstrated that voltage remained steady at about 8.2 volts. After approximately 100 hours of operation there was minimal anion membrane degradation near the anode chamber inlet. After approximately 260 hours of operation salt structures were observed around the front and bottoms of cell gaskets, indicating slow external leakage of electrolytic solution. After approximately 430 hours of operation no damage was detected.

After approximately 480 hours of operation internal cell leakage occurred terminating the analysis. Internal cell leakage was observed via the brine volume increasing in the brine tank rather than decreasing as it should during normal operation. This indicated an internal leakage between chambers (e.g. anion membrane rupture). However, after the 480 hours of operation, the nonwoven polyester support member did not have any notable deterioration, indicating that the support remained in good condition and performed its function.

Example 3

Material Compatibility Testing of Support Members. Various support member substrates were analyzed to determine compatibility with electrolysis solutions (namely bleach solutions). The following substrates and conditions were tested (shown in Table 1):

TABLE 1

| Material | Solution | Treatment | Measurements |
|---|---|---|---|
| Polypropylene Nonwoven | Acidified Salt Brine | Compressed 30% (PVC Blocks) | Thickness Elasticity |
| Polypropylene Nonwoven | Acidified Salt Brine | Uncompressed (Glass Jars) | Thickness Elasticity TOC |
| Polyester Nonwoven | Acidified Salt Brine | Compressed 30% (PVC Blocks) | Thickness Elasticity |
| Polyester Nonwoven | Acidified Salt Brine | Uncompressed (Glass Jars) | Thickness Elasticity TOC |

Support member samples were 1.5 inch diameter circles cut from the tested material/fabric. Both materials were about 0.375 inch (nominal) thickness at a density of 2.25 lb/yd$^2$. The polypropylene material was obtained from McMaster-CARR (PN 88125K999), Manufactured by Buffalo Felt. The polyester material was from Grainger (PN 2HVC3), Manufactured by Superior Felt and Filtration.

Thickness, elasticity and chemical degradation measurements were taken after a six week soak test at about 120° F. The support member materials were soaked in an acidified salt brine that was created by mixing pure salt with DI water (to saturation) and acidifying to a pH of less than 1 with HCL.

Chemical degradation analysis measured total organic carbon (TOC) from the soaking solutions before and after the soak test to determine if the nonwoven support member was degrading and losing carbon into the soaking solution. The results show the support members only lost a negligible amount of carbon into solution, indicating compatibility for use according to the methods of the invention. The thickness and elasticity results further supported compatibility for the application according to the invention.

Example 4

The use of an electrolytic cell housing a support member to reduce operating voltage for electrolytic cells was further analyzed. A three chamber electrolytic cell, as structurally disclosed in U.S. Pat. Nos. 5,288,385, 6,524,454 and Japanese Patent No. 6,179,757, was disassembled to replace a rigid plastic membrane support with a nonwoven polyester material for use as a support member. The polyester material was a single layer, approximately 0.25 inch think nonwoven, felt fabric that was die-cut and added to the intermediate chamber. The support member material was obtained from Grainger (PN 2HVC2).

Approximately 364 hours of operation of the electrolytic cell were tested. The cell started at 5.2 volts and rose slowly to 6.8 volts in the first 364 hours. Ongoing testing was completed with over 1800 hours accumulated, with the voltage remaining in the 6.5-6.9 range, demonstrating significant operating efficiency.

The cell efficiency was further compared to the same three chamber electrolytic cell without the disassembly and replacement of the rigid plastic membrane support with a nonwoven polyester material for use as a support member. The control (three chambered electrolytic cell housing a rigid plastic membrane support) cell started at a considerably higher voltage (10.8 volts) and within 5.5 hours the voltage increased to the limit of the power supply used, 19.0 volts. At that point, the test was ended due to the power supply limitation.

The comparison of the control testing with the electrolytic cell housing the support member demonstrates the improvements of the electrolytic cell and methods of the invention for improving operating conditions, namely operating the electrolytic cell at a lower, acceptable voltage.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A three-chambered electrolytic cell, comprising:
an anode chamber housing an anode;
a cathode chamber housing a cathode;
an intermediate chamber between the anode and cathode chambers, wherein electrolyte passes through the intermediate chamber;
an anion exchange membrane positioned between the anode and the intermediate chamber;
a cation exchange membrane positioned between the cathode and the intermediate chamber;
a plurality of holes in the anode chamber, cathode chamber, and intermediate chamber, wherein said plurality of holes are in locations that coincide with one another and allow fasteners to pass through to hold the cell together, and wherein the plurality of holes in at least one chamber are recessed and wherein the plurality of holes in at least one chamber are threaded; and
a support member positioned against and applying pressure to both the anion exchange membrane causing the membrane to be in contact with the anode and the cation exchange membrane causing the membrane to be in contact with the cathode, wherein the support member comprises a porous material.

2. The electrolytic cell of claim 1 further comprising a first gasket positioned between the anode chamber and the anode, a second gasket positioned between the anion exchange membrane and the intermediate chamber, a third gasket positioned between the intermediate chamber and the cation exchange membrane, and a fourth gasket positioned between the cathode and the cathode chamber.

3. The electrolytic cell of claim 1 wherein the support member comprises a nonwoven fabric.

4. The electrolytic cell of claim 1 wherein the support member comprises a porous synthetic material.

5. The electrolytic cell of claim 1 wherein the support member comprises a woven or nonwoven fabric selected from the group consisting of polyvinylfluoride fiber, asbestos, glass wool, polyvinylchloride fiber, polyvinylidenechloride fiber, polyester fiber, aromatic polyamide fiber, polypropylene, polyethylene and combinations of the same.

6. The electrolytic cell of claim 1 wherein the support member comprises a plurality of layers of a nonwoven fabric, porous material.

7. The electrolytic cell of claim 1 wherein the support member is a rigid member with or without a spring-loaded mechanism.

8. The electrolytic cell of claim 1 wherein the anode and the cathode include a plurality of openings of any shape there through and at least one electrical connection.

9. The electrolytic cell of claim 1 wherein the intermediate chamber includes an aperture there through and wherein the electrolyte is a brine.

10. The electrolytic cell of claim 9 wherein the support member is positioned within the aperture of the intermediate chamber.

11. An electrolytic cell support member comprising:
a support member positioned within an intermediate chamber of a three-chamber electrolytic cell, wherein the three-chamber electrolytic cell contains a plurality of holes in a cathode chamber, anode chamber, and intermediate chamber in locations that coincide with one another and allow fasteners to pass through to hold the cell together, wherein the plurality of holes in at least one chamber are recessed and wherein the plurality of holes in at least one chamber are threaded, wherein electrolyte solution passes through said intermediate chamber;
wherein the support member applies pressure to an ion exchange membrane and a cation exchange membrane within an electrolytic cell causing the membranes to be in contact with electrodes of the electrolytic cell;
wherein the support member does not have holes for fastener to pass through; and
wherein the support member comprises a porous, compressible material.

12. The support member of claim 11 wherein the support member applies pressure to an anion exchange membrane causing the membrane to be in contact with an anode in an anode chamber of the three-chamber electrolytic cell.

13. The support member of claim 11 wherein the support member applies pressure to a cation exchange membrane causing the membrane to be in contact with a cathode in a cathode chamber of the three-chamber electrolytic cell.

14. The support member of claim 11 wherein the support member comprises a nonwoven fabric.

15. The support member of claim 11 wherein the support member comprises a porous synthetic material.

16. A method of providing electrolytic cell membrane support comprising:
preparing an electrolytic cell for electrolysis of a solution, comprising providing an anode chamber housing an anode, a cathode chamber housing a cathode, an intermediate chamber between the anode and cathode chambers, an anion exchange membrane positioned between the anode and the intermediate chamber, a cation exchange membrane positioned between the cathode and the intermediate chamber, electrolyte passes through the intermediate chamber, a plurality of holes in the anode chamber, cathode chamber, and intermediate chamber, wherein said plurality of holes are in locations that coincide with one another and allow fasteners to pass through to hold the cell together, wherein the plurality of holes in at least one chamber are recessed and wherein the plurality of holes in at least one chamber are threaded, and a support member positioned within the intermediate chamber, wherein the support member is a porous, compressible material that applies pressure to the exchange membranes causing the exchange membranes to be in contact with the respective electrodes of the electrolytic cell; and applying an electric current, wherein the membrane support decreases voltage requirement of the electrolytic cell.

17. The method of claim 16 wherein the preparing of the electrolytic cell does not require aligning the support member with an exchange membrane and/or an electrode to condition the cell for electrolysis.

18. The method of claim 16 wherein the support member applies pressure to the exchange membrane causing the membrane to be in contact with the electrode.

19. The method of claim 16 wherein the support member comprises a nonwoven fabric.

20. The method of claim 16 wherein the support member is a non-synthetic or synthetic porous material.

21. The method of claim 16 wherein the membrane support increases chlorine production of the electrolytic cell.

* * * * *

UNITED STATES PATENT AND TRADEMARK OFFICE
CERTIFICATE OF CORRECTION

PATENT NO. : 8,882,972 B2  
APPLICATION NO. : 13/185874  
DATED : November 11, 2014  
INVENTOR(S) : Kevin A. Wuebben et al.

Page 1 of 1

It is certified that error appears in the above-identified patent and that said Letters Patent is hereby corrected as shown below:

IN THE CLAIMS:

Col 14, Claim 11, Line 24:
DELETE after an "ion"
ADD after an --anion--

Signed and Sealed this
Third Day of March, 2015

Michelle K. Lee
*Deputy Director of the United States Patent and Trademark Office*